US012784140B2

(12) United States Patent
Mironică et al.

(10) Patent No.: US 12,784,140 B2
(45) Date of Patent: Nov. 3, 2026

(54) COMPOSITING USING IMAGE HARMONIZATION

(71) Applicant: ADOBE INC., San Jose, CA (US)

(72) Inventors: Ionut Mironică, Bucharest District (RO); Marian Lupaşcu, Bucharest (RO); Alexandru Vasile Costin, Monte Sereno, CA (US); Cristian Catalin Buzoiu, Bucharest (RO); Aliakbar Darabi, Newcastle, WA (US)

(73) Assignee: ADOBE INC., San Jose, CA (US)

( * ) Notice: Subject to any disclaimer, the term of this patent is extended or adjusted under 35 U.S.C. 154(b) by 600 days.

(21) Appl. No.: 18/334,610

(22) Filed: Jun. 14, 2023

(65) Prior Publication Data

US 2024/0420394 A1 Dec. 19, 2024

Related U.S. Application Data

(60) Provisional application No. 63/379,813, filed on Oct. 17, 2022.

(51) Int. Cl.

| | |
|---|---|
| ***G06T 5/50*** | (2006.01) |
| ***G06T 11/10*** | (2026.01) |
| ***G06T 11/60*** | (2006.01) |

(52) U.S. Cl.

CPC ................ *G06T 5/50* (2013.01); *G06T 11/10* (2026.01); *G06T 11/60* (2013.01)

(58) Field of Classification Search

CPC ................... G06T 11/60; G06T 11/001; G06T 2207/10024; G06T 2207/20081; G06T 2207/20084

See application file for complete search history.

(56) References Cited

U.S. PATENT DOCUMENTS

| | | | | |
|---|---|---|---|---|
| 2009/0003700 A1* | 1/2009 | Xiao | G06V 30/155 | 382/176 |
| 2013/0022287 A1* | 1/2013 | Hooper | G06T 5/20 | 382/254 |
| 2015/0010246 A1* | 1/2015 | Hepper | G06T 5/70 | 382/254 |
| 2016/0284070 A1* | 9/2016 | Pettigrew | G06T 5/92 | |

(Continued)

OTHER PUBLICATIONS

Kim, Gwanghyun, "DiffusionCLIP: Text-Guided Diffusion Models for Robust Image Manipulation", Proceedings of the IEEE/CVF Conference on Computer Vision and Pattern Recognition (CVPR), Jun. 2022, pp. 2426-2435 (Year: 2022).*

(Continued)

*Primary Examiner* — Terrell M Robinson
(74) *Attorney, Agent, or Firm* — F. CHAU & ASSOCIATES, LLC

(57) ABSTRACT

Systems and methods are provided for image editing, and more particularly, for harmonizing background images with text. Embodiments of the present disclosure obtain an image including text and a region overlapping the text. In some aspects, the text includes a first color. Embodiments then select a second color that contrasts with the first color, and generate a modified image including the text and a modified region using a machine learning model that takes the image and the second color as input. The modified image is generated conditionally, so as to include the second color in a region corresponding to the text.

20 Claims, 13 Drawing Sheets

(56) References Cited

U.S. PATENT DOCUMENTS

| | | | | |
|---|---|---|---|---|
| 2019/0114743 | A1 | 4/2019 | Lund et al. | |
| 2019/0279346 | A1* | 9/2019 | Zhang | G06T 7/33 |
| 2021/0217215 | A1 | 7/2021 | Sousa et al. | |
| 2021/0383584 | A1* | 12/2021 | Zhang | G06T 11/60 |
| 2023/0134337 | A1* | 5/2023 | Li | G06T 11/60 |
| | | | | 382/103 |

OTHER PUBLICATIONS

Rombach, R., et al., "High-Resolution Image Synthesis with Latent Diffusion Models", arXiv preprint arXiv:2112.10752v2 [cs.CV] Apr. 13, 2022, pp. 1-45.
Ramesh, A., et al., "Hierarchical Text-Conditional Image Generation with CLIP Latents", arXiv preprint arXiv:2204.06125v1 [cs. CV] Apr. 13, 2022, 27 pages.
Li, F., et al., "Mask DINO: Towards a Unified Transformer-based Framework for Object Detection and Segmentation", arXiv preprint arXiv:2206.02777v3 [cs.CV] Dec. 12, 2022, 14 pages.
W3C, "Ensuring that a contrast ratio of at least 4.5:1 exists between text (and images of text) and background behind the text", 2015, 4 pages, found on the internet at https://www.w3.org/TR/WCAG20-TECHS/G18.html.
Lertrusdachakul, T., et al., "Color Palette Extraction by Using Modified K-means Clustering", In Int. Electrical Engineering Congress, 2019, 4 pages.
Efros, A. et al., "Image Quilting for Texture Synthesis and Transfer", in ACM SIGGRAPH, 2001, pp. 341-346.
Combined Search and Examination Report dated Feb. 7, 2024 in corresponding United Kingdom Patent Application No. 2312396.1 (6 pages).

* cited by examiner

COMPOSITING USING IMAGE HARMONIZATION

CROSS-REFERENCE TO RELATED APPLICATION

This U.S. non-provisional application claims priority under 35 U.S.C. § 119 to U.S. Provisional Patent Application No. 63/379,813, filed on Oct. 17, 2022, in the United States Patent and Trademark Office, the disclosure of which is incorporated by reference herein in its entirety.

BACKGROUND

The following relates generally to image editing, and more specifically to harmonizing images and text. Compositing involves combining text and graphic elements into a single image. This technique is widely used in graphic design, advertising, and digital media. The text and images are layered on top of each other to create a final composition. The objective of compositing is to convey information or tell a story through visual elements, and to create an appealing and engaging visual experience for the viewer. Techniques such as color correction, blending, and masking are often used to achieve a desired look and feel, and to make the text and images appear seamless together.

There are several considerations to take into account when creating compositions with text and background images. The text and the background image should have enough contrast with respect to one another to ensure the text is easily readable. The text should be legible and not interfere with the background image. In some cases, graphic designers will apply various effects to the text to provide sufficient contrast and legibility, such as the use of distances, perspective, colors from the cold and warm spectrums, etc.

SUMMARY

The present disclosure describes systems and methods for changing the image underneath the text to increase the contrast and legibility of the text. Embodiments receive an image and a text, apply pre-processing to the image, and generate a new image that includes contrasting color within a region of the text. Embodiments include a generative machine learning model such as a stable diffusion model which is configured to produce a similar image to the original image, except for the region corresponding to the text. For example, the generative machine learning model can be configured to receive the pre-processed image as a condition for a generative diffusion process.

A method, apparatus, non-transitory computer readable medium, and system for harmonizing text and background images are described. One or more aspects of the method, apparatus, non-transitory computer readable medium, and system include obtaining an image including text and a region overlapping the text, wherein the text comprises a first color; selecting a second color that contrasts with the first color; and generating a modified image including the text and a modified region using a machine learning model that takes the image and the second color as input, wherein the modified region overlaps the text and includes the second color.

An apparatus, system, and method for harmonizing text and background images are described. One or more aspects of the apparatus, system, and method include a non-transitory computer readable medium storing code, the code comprising instructions executable by a processor to: obtain an image including text and a region overlapping the text, wherein the text comprises a first color; select a second color from the region overlapping the text, wherein the second color contrasts with the first color; and generate a modified image including the text using a machine learning model that takes the image and the second color as input, wherein the modified region overlaps the text and includes the second color.

An apparatus, system, and method for harmonizing text and background images are described. One or more aspects of the apparatus, system, and method include a processor; a memory including instructions executable by the processor to perform operations including: obtaining an image and text overlapping the image, wherein the text comprises a first color; selecting a second color that contrasts with the first color; and generating a background image for the text based on the second color using a machine learning model, wherein the background image includes the second color in a region corresponding to the text.

DETAILED DESCRIPTION

Figure 1:
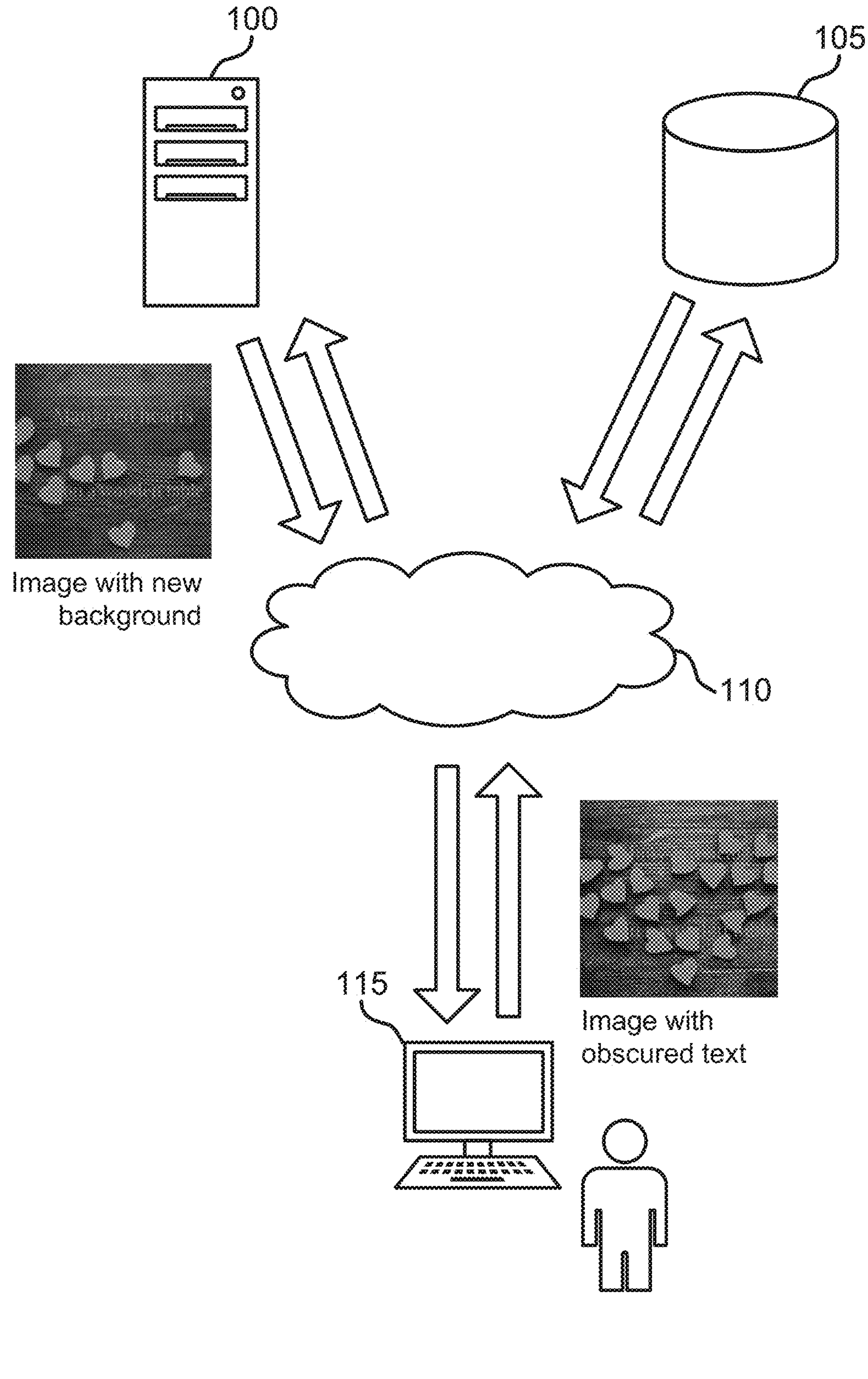
FIG. 1 shows an example of an image editing system according to aspects of the present disclosure.

Graphic design is a discipline that involves the use of visual elements, such as images and text, to communicate ideas and information. One of the core aspects of graphic design is combining images with text to create a visually appealing and effective composition. This can involve layering images, adjusting colors, adjusting the size and placement of text, and choosing the right typography to convey the desired message.

When combining images with text, graphic designers must consider many factors, including the context of the image, the purpose of the design, the target audience, and the medium in which the design will be displayed. For example, a graphic design for a website may require different considerations than a design for a print publication.

One of the key challenges in combining images with text is finding the right balance between the two elements. Graphic designers must choose the right typography, adjust the size and placement of the text, and choose images that complement the text to create a harmonious composition.

In addition, designers must consider issues such as legibility, readability, and accessibility when creating designs that combine images and text. This can involve adjusting the contrast between the text and the background, choosing typefaces that are easily legible, and ensuring that the text is accessible to people with disabilities.

In some cases, graphic designers will apply various effects to the text to provide sufficient contrast and legibility. The effects can include drop-shadows, glows, adding a solid background to the text, and changing the color of the text. However, these changes are destructive to the design features of the text. Furthermore, changes to the text that add significant areas such as adding a solid background may obscure the image underneath the text.

Moreover, the application of more sophisticated techniques such as placing the text in the perspective of the image, or changing the colors of the text in based on contrasting color temperatures with the background, may require the underlying image to include a certain perspective or color temperature. In some cases, the underlying image is incompatible with these techniques.

Embodiments of the present disclosure include an image editing apparatus that is configured to edit the image underneath the text rather than the text itself. In this way, the design features of the text are preserved throughout the compositing process.

Some embodiments are configured to pre-process the image by extracting a color that contrasts with the text, performing panoptic segmentation to identify objects in the image that overlap with the text, and coloring the objects with the contrasting color. Some embodiments then add Gaussian noise in the text overlap regions that includes the contrasting color. Then, embodiments use this altered image as a condition to a generative machine learning model to generate a new modified image, which can remain largely similar to the original background image, but now contains the contrasting color in the text overlap region to provide improved contrast.

Color contrast between two colors refers to the visual difference between the two colors in terms of hue, saturation, and brightness. For example, a dark color and a light color may have a high contrast, e.g., the dark color and the light color have a large degree of difference in terms of hue, saturation, and brightness. A high contrast between two colors can make text stand out and be easily legible against a background. A low contrast between two colors means that the difference between the two colors is not as noticeable, which can make text harder to read and less prominent against a background.

In some cases, a second color contrasts with a first color when the two colors sufficient contrast such that the two colors create a visual difference that makes the two colors stand out and be easily legible against each other.

According to some embodiments, a (Hue-Saturation-Value) HSV color space is used for the panoptic segmentation, but the disclosure might not be necessarily limited thereto. Unlike the RGB color mode representing color as a combination of red, green, and blue light intensities, the HSV color model represents color as a combination of hue, saturation, and value (brightness). Using the HSV color space provides a way to manipulate color information intuitively because it separates the chromatic information (hue and saturation) from the luminance information (value). This separation of chromatic and luminance information allows adjusting the hue, saturation, and value independently and makes it easier to perform image processing tasks including color segmentation.

In some cases, objects cannot be confidently identified using panoptic segmentation, and therefore cannot be accurately colored before Gaussian noise is applied. For example, the image might not include distinguishable objects. In these cases, embodiments are configured to extract "superpixels" from the original image, which are blocks of the original image with an average color that is outside of a predetermined range in a color space, such as HSV. Then, these superpixels are applied in the text overlap regions, colored Gaussian noise is further applied, and the resulting altered image is provided as a condition to the generative machine learning model to generate the new background image.

Some embodiments replace the underlying image by using a combination of white Gaussian noise and colored Gaussian noise, where the colored noise includes a color that contrasts with the text. The term "colored" in the colored noise refers to the fact that the noise includes a relatively high amount of a color, rather than being a random grayscale noise. For example, some embodiments place the colored Gaussian noise in a region that will overlap with the text in the final composite, and generate one or more images that include contrasting colors in the regions that overlap with the text. The one or more images may be used as design variants for a given text.

Accordingly, embodiments improve the graphic design process by providing an image harmonization method that is not destructive to the design features of an input text. This allows graphic designers to adhere to a design language, such as one specified by a particular brand, while producing composite designs with legible text.

An image editing system is described with reference to FIGS. 1-2. Methods for generating graphic designs using the image editing system are described with reference to FIGS. 3-8. A generative machine learning model used by the image editing system is described with reference to FIGS. 9-12. A computing device that may be used to implement the image editing system is described with reference to FIG. 13.

Image Editing System

An apparatus for harmonizing text and background images is described. One or more aspects of the apparatus include a processor; a memory including instructions executable by the processor to perform operations including: obtaining an image and text overlapping the image, wherein the text comprises a first color; selecting a second color that contrasts with the first color; and generating a background image for the text based on the second color using a machine learning model, wherein the background image includes the second color in a region corresponding to the text.

Some examples of the apparatus, system, and method further include a segmentation component configured to segment the image to identify one or more objects. Some examples further include a noise component configured to add noise to the image in the region corresponding to the text.

Some examples of the apparatus, system, and method further include a superpixel component configured to extract a plurality of superpixels from the region corresponding to the text. Some examples further include a combination component configured to combine the image and the background image to obtain a combined image. In some aspects, the machine learning model comprises a generative diffusion model.

FIG. 1 shows an example of an image editing system according to aspects of the present disclosure. The example shown includes image editing apparatus 100, database 105, network 110, and user interface 115.

In an example, a user provides a design that includes a text and an image to image editing apparatus 100 via user interface 115. Then the system generates a noisy image based on the image and the text as input to a machine learning model. The machine learning model uses the noisy image as a condition to generate a new background image. For example, the noisy image may include noise that is concentrated in one or more regions beneath the text, and the machine learning model may transfer the non-noisy portions of the image with minimal changes while introducing contrast in the noisy portions. In some cases, one or more components or aspects of image editing apparatus 100 are stored on database 105, such as model parameters, reference images, and the like, and such information is exchanged between image editing apparatus 100 and database 105 via network 110. Image editing apparatus 100 then provides the newly generated image to the user via user interface 115.

In some examples, one or more components of image editing apparatus 100 are implemented on a server. A server provides one or more functions to users linked by way of one or more of the various networks 110. In some cases, the server includes a single microprocessor board, which includes a microprocessor responsible for controlling all aspects of the server. In some cases, a server uses microprocessors and protocols to exchange data with other devices/users on one or more of the networks 110 via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Data used by the image editing system includes generative machine learning models, training data, cached images, fonts, design elements, and the like. In some cases, database 105 includes data storage and a server to manage the disbursement of data and content. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, a user interacts with the database controller. In other cases, the database controller may operate automatically without user interaction.

Network 110 facilitates the transfer of information between a user, database 105, and image editing apparatus 100. Network 110 can be referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, image editing apparatus 100 obtains an image and text overlapping the image, where the text includes a first color. In some examples, image editing apparatus 100 superimposes the text on the modified image to obtain a composite image. In some cases, superimposing the text on the modified image includes combining the text and the modified image into a single image by taking the original text image and overlaying it on the modified image, resulting in a composite image where both the text and background are visible. For example, the superimposing process may create a mask for the text and blend it with the modified image, so that the text appears to be seamlessly integrated with the background. The result is a new image with the text superimposed on the modified image.

According to some aspects, image editing apparatus 100 includes a non-transitory computer readable medium storing code that is configured to perform the methods described herein. Image editing apparatus 100 is an example of, or includes aspects of, the corresponding element described with reference to FIG. 2.

Figure 2:
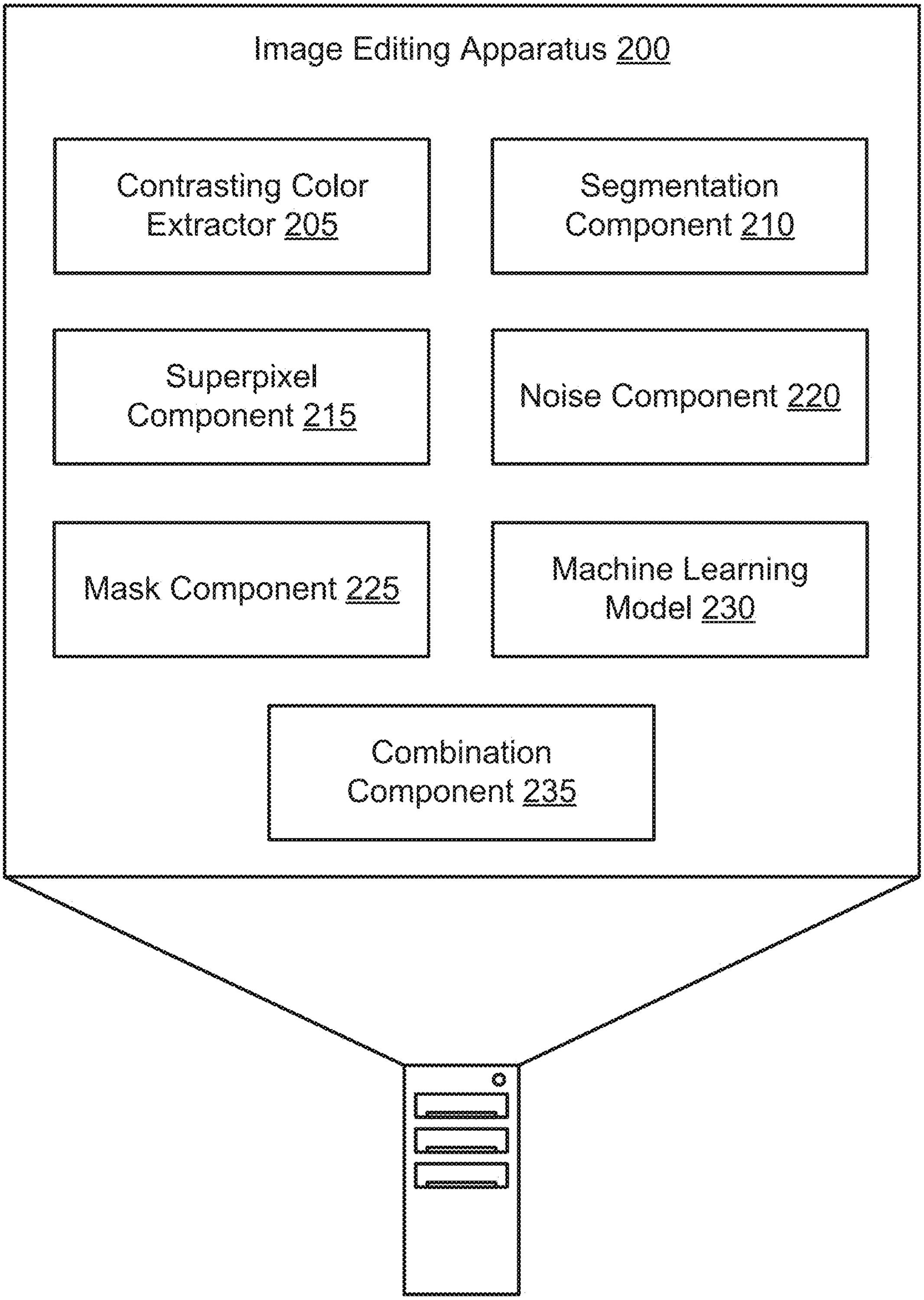
FIG. 2 shows an example of an image editing apparatus according to aspects of the present disclosure.

FIG. 2 shows an example of an image editing apparatus 200 according to aspects of the present disclosure. The example shown includes image editing apparatus 200, contrasting color extractor 205, segmentation component 210, superpixel component 215, noise component 220, mask component 225, machine learning model 230, and combination component 235. Image editing apparatus 200 is an example of, or includes aspects of, the corresponding element described with reference to FIG. 1.

Embodiments of image editing apparatus 200 include several components. The term 'component' is used to partition the functionality enabled by the processors and the executable instructions included in the computing device used to implement image editing apparatus 200 (such as the computing device described with reference to FIG. 13). The partitions may be implemented physically, such as through the use of separate circuits or processors for each component, or may be implemented logically via the architecture of the code executable by the processors.

One or more components of image editing apparatus 200 use trained models. In one example, at least machine learning model 230 includes a trained model, but the present disclosure is not necessarily limited thereto. The machine learning model may include an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function corresponding to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse one or more layers multiple times.

In some embodiments, machine learning model 230 includes a convolutional neural network (CNN). A CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, machine learning model 230 generates a modified image for the text based on the second color, where the modified image includes the second color in a region corresponding to the text. The region corresponding to the text may be the area of the image that contains the text. For example, this region may be obtained by cropping the image based on the position and size of the text. In some aspects, the machine learning model 230 includes a generative diffusion model. Additional details regarding a generative diffusion model will be provided with reference to FIGS. 9-12.

Contrasting color extractor 205 is a component or body of instructions that is configured to extract a color from the input image that contrasts with the input text. According to some aspects, contrasting color extractor 205 selects a second color that contrasts with the first color. In some examples, contrasting color extractor 205 generates a color palette based on an area of the image overlapping the text, where the second color is selected from the color palette. Methods for extracting contrastive colors will be provided with reference to FIG. 3.

Segmentation component 210 is configured to perform panoptic segmentation on the input image. Panoptic segmentation involves both semantic segmentation and instance segmentation and is considered a "unified segmentation" approach. The objective of panoptic segmentation is to extract, label, and classify objects in the image.

According to some aspects, segmentation component 210 segments the image to identify one or more objects overlapping the text, i.e., one or more objects in a text region. In some examples, segmentation component 210 applies a contrastive color to the one or more objects to obtain a first modified image, where the modified image is generated based on the first modified image.

In some examples, segmentation component 210 computes a probability score for the one or more objects indicating the likelihood of the presence of the one or more objects. In some examples, segmentation component 210 determines a low probability for the presence of the one or more objects based on the probability score. In this case, embodiments may proceed to process the image according to branch B in the second phase of a first algorithm for pre-processing, as described with reference to FIG. 5.

According to some aspects, superpixel component 215 extracts a set of superpixels from the region of the image overlapping the text based on the determination of the low probability, where an intermediately processed image includes the set of superpixels. Superpixels are blocks of the original image with an average color that is outside of a predetermined range in a color space, such as HSV. In an example, when the system is unable to confidently color objects within the region overlapping the text, the system may instead paste a texture including the superpixels in the region, and then add noise to the region to generate a noisy image as input to machine learning model 230. Additional detail regarding this process will be provided with reference to FIG. 5.

Noise component 220 is configured to generate noise information in, for example, a pixel space. Noise component 220 may generate a noise according to, for example, a Gaussian function. According to some aspects, noise component 220 adds noise to the image in the region corresponding to the text to obtain a noisy image, where the modified image is generated based on the noisy image. In some aspects, at least a portion of the noise includes colored noise corresponding to the second color.

According to some aspects, mask component 225 generates a mask indicating the region corresponding to the text, where the noise is added to the image based on the mask. The mask may use dimension, shape, orientation, placement, or other information from the text to generate the mask. In some cases, mask component 225 receives noise information from noise component 220 before generating the mask.

In at least one embodiment, a subset of the input image, rather than the whole image, is processed for input to machine learning model 230. In this case, machine learning model 230 performs "inpainting" by generating a modified image smaller than the image and with subset dimensions. According to some aspects, combination component 235 combines the image and the modified image to obtain a combined image.

One or more embodiments of the system described above include a non-transitory computer readable medium storing code, the code comprising instructions executable by a processor to obtain an image and text overlapping the image, wherein the text comprises a first color; select a second color from an area of the image overlapping the text, wherein the second color contrasts with the first color; and generate a modified image for the text based on the second color using a machine learning model, wherein the modified image includes the second color in a region corresponding to the text.

Some examples of the non-transitory computer readable medium further include code executable to segment the image to identify one or more objects overlapping the text. Some examples further include code executable to apply the second color to the one or more objects to obtain a first modified image, wherein the modified image is generated based on the first modified image.

Some examples of the non-transitory computer readable medium further include code executable to compute a probability score for the one or more objects indicating the likelihood of the presence of the one or more objects. Some examples further include code executable to determine a low probability for the presence of the one or more objects based on the probability score. Some examples further include code executable to extract a plurality of superpixels from the area of the image overlapping the text based on the determination, wherein the first modified image includes the plurality of superpixels.

Some examples of the non-transitory computer readable medium further include code executable to add noise to the image in the region corresponding to the text to obtain a noisy image, wherein the modified image is generated based on the noisy image.

Some examples further include code executable to combine the image and the modified image to obtain a combined image. Some examples further include code executable to superimpose the text on the modified image to obtain a composite image.

Generating Designs

A method for harmonizing text and background images is described. One or more aspects of the method include obtaining an image and text overlapping the image, wherein the text comprises a first color; selecting a second color that contrasts with the first color; and generating a modified image for the text based on the second color using a machine learning model, wherein the modified image includes the second color in a region corresponding to the text.

Some examples of the method, apparatus, non-transitory computer readable medium, and system further include generating a color palette based on an area of the image overlapping the text, wherein the second color is selected from the color palette. Some examples of the method, apparatus, non-transitory computer readable medium, and system further include segmenting the image to identify one or more objects overlapping the text. Some examples further include applying the second color to the one or more objects to obtain a first modified image, wherein the modified image is generated based on the first modified image.

Some examples further include adding noise to the image in the region corresponding to the text to obtain a noisy image, wherein the modified image is generated based on the noisy image. Some examples further include generating a mask indicating the region corresponding to the text, wherein the noise is added to the image based on the mask. In some aspects, at least a portion of the noise comprises colored noise corresponding to the second color.

Some examples of the method, apparatus, non-transitory computer readable medium, and system further include combining the image and the modified image to obtain a combined image. For example, the modified image may correspond to a subset region of the image, and may be combined with the image to obtain a combined image that is used as the modified image in the final design. Some examples system further include superimposing the text on the modified image to obtain a composite image.

Figure 3:
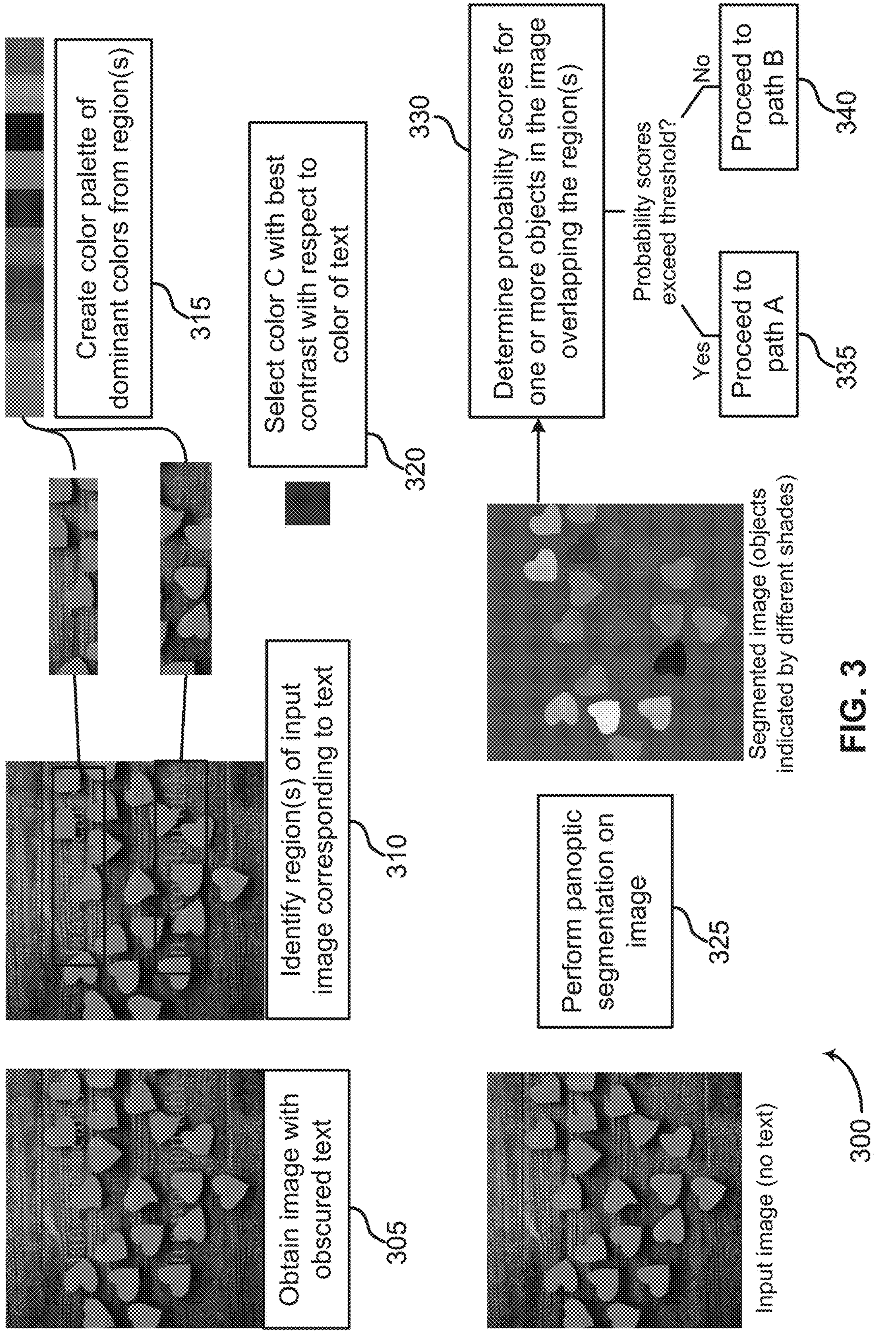
FIG. 3 shows an example of a method for a first phase in a first algorithm for image harmonization according to aspects of the present disclosure.

The present disclosure provides two main algorithms that the system is configured to execute on an input design, but it will be appreciated that the substeps may be combined in different ways to generate variations of the algorithms described herein. FIG. 3 shows an example of a method 300 for a first phase in a first algorithm for image harmonization according to aspects of the present disclosure. The first phase may be referred to as a "pre-processing" phase or portion of the algorithm. In some examples, these operations are performed by a system including a processor executing a set of codes to control functional elements of an apparatus. Additionally or alternatively, one or more processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the system obtains image with obscured text. For example, a user may provide the system with the image and the obscured text via a user interface such as graphical user interface (GUI). The GUI may be a component of an illustrator program or a web-app.

At operation 310, the system identifies region(s) of input image corresponding to text. The region(s) include the area that is covered by the text, and may further include padding that extends marginally beyond the text. The region corresponding to the text may be the area of the image that contains the text. For example, this region may be obtained by cropping the image based on the position and size of the text. In some cases, the region corresponding to the text also includes portions of the image that are not underlying the text or covered by the text.

At operation 315, the system creates color palette of dominant colors from region(s). The operations of this step refer to, or may be performed by, a contrasting color extractor as described with reference to FIG. 2. In some embodiments, the colors are extracted using a clustering algorithm on the Lab space of the image. Lab space is a type of color space, where 'L' is a spectrum of lightness values, 'a' is a spectrum of red/green values, and 'b' is a spectrum of blue/yellow values. The clustering algorithm groups similar colors together into clusters based on their lightness, red-green spectrum, and blue-yellow spectrum values in the Lab color space. Once the colors have been grouped into clusters, the dominant colors are extracted from these clusters.

In some embodiments, the dominant colors in the region (s) are extracted and sorted according to a contrast ratio R. An example of R is provided by Equation 1:

$$R = \frac{L_1 + 0.05}{L_2 + 0.05} \quad (1)$$

where $L_1$ is the relative luminance of the lighter of the foreground or background colors, and $L_2$ is the relative luminance of the darker of the foreground or background colors. Relative luminance is a measure of the brightness of a color, relative to the brightness of a reference color. In one example, the relative luminance of the lighter color $L_1$ is the brightness of the lighter color in the image, relative to the brightness of a reference color. The relative luminance of the darker color $L_2$ is the brightness of the darker color in the image, relative to the brightness of the reference color.

At operation 320, the system selects color C with highest contrast with respect to color of text. Color C may be selected from the palette of colors produced by the process described above. In cases where there is no color in the region(s) with the threshold R, embodiments may select a contrastive color from the Lab space.

At operation 325, the system performs panoptic segmentation on image. The objective of panoptic segmentation is to extract, label, and classify objects in the image. In some cases, panoptic segmentation produces one or more additional images that are segmentation masks. In some cases, operation 325 includes performing a simultaneous and unified segmentation of both the background (e.g., the surrounding context, such as the sky, grass, or pavement) and the objects (e.g., the instances, such as people, cars, or buildings). For example, operation 325 performs a simultaneous and unified segmentation of both the background and the text. In some cases, operation 325 includes analyzing an image and producing a label map that segments the image into multiple regions, each with a corresponding class label.

At operation 330, the system determines probability scores for one or more objects in the image overlapping the region(s). The probability scores are produced by the panoptic segmentation operation and indicate the confidence of segmentation for each object. The probability scores may be lower for objects with blurry edges, objects with similar colors to background elements, etc. In some cases, the result of the determination changes the logic path of the algorithm in its second phase.

At operation 335, the system determines that the aggregate of the probability scores exceeds a threshold, and proceeds to path A, which is described with reference to FIG. 4. If the system determines that the aggregate of the probability scores does not meet the threshold, the system proceeds to path B at operation 340. Path B is described with reference to FIG. 5.

Figure 4:
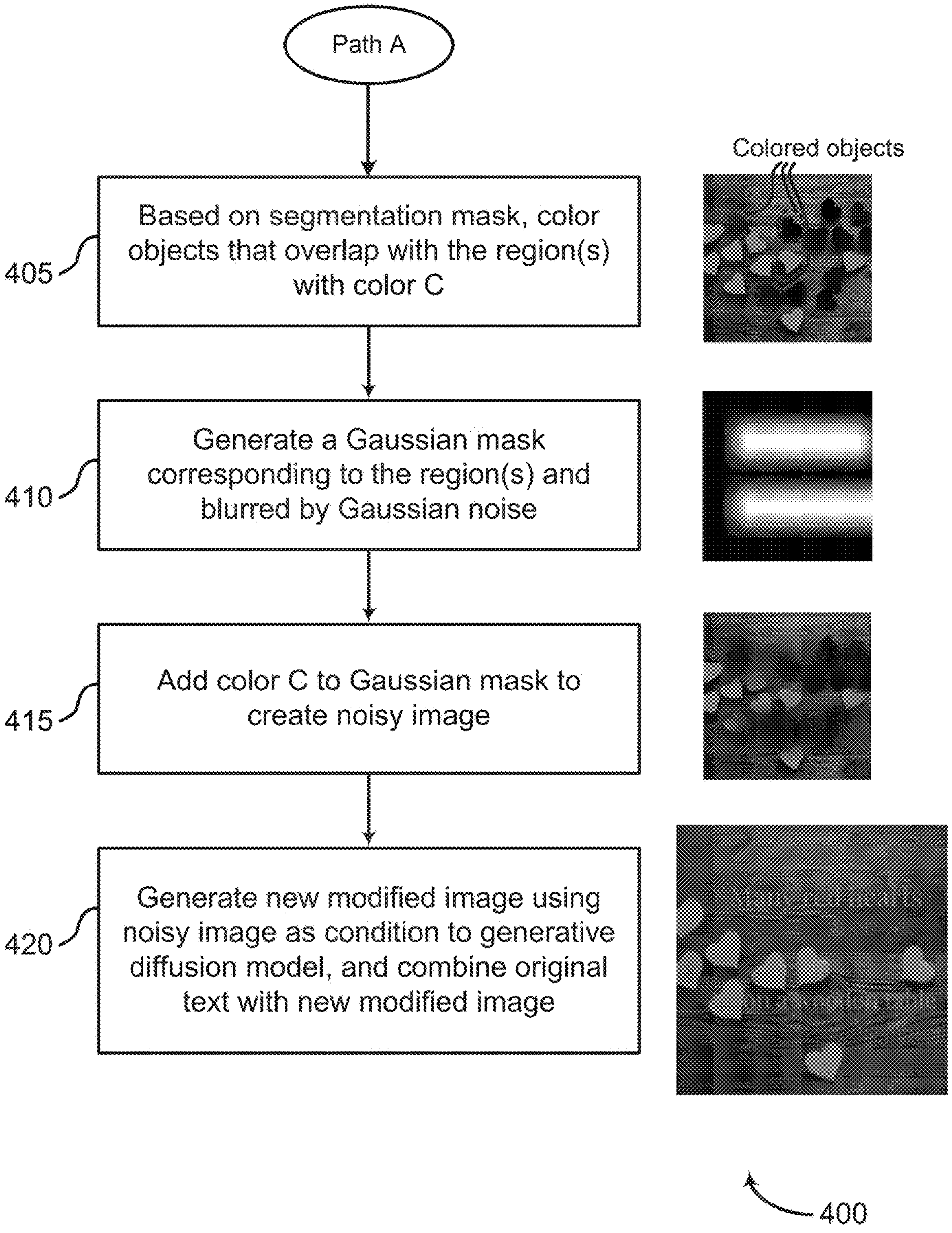
FIG. 4 shows an example of a method for branch A in a second phase in the first algorithm according to aspects of the present disclosure.

FIG. 4 shows an example of method 400 for branch A in the second phase in the first algorithm according to aspects of the present disclosure. In some examples, these operations are performed by a system including a processor executing a set of codes to control functional elements of an apparatus. Additionally or alternatively, one or more processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system colors objects that overlap with the region(s) with color C based on a segmentation mask. The operations of this step refer to, or may be performed by, a segmentation component as described with reference to FIG. 2. In an example, the system iterates through the objects in the region(s) identified by panoptic segmentation, and determines if each object has a non-compatible dominant color. For each object with a non-compatible dominant color, the system may then apply color C, which contrasts with the color of the text, to each of the objects. Note, that coloring the objects in this way may result in an unnatural-looking image, and the algorithm does not end here.

At operation 410, the system generates a Gaussian mask corresponding to the region(s) blurred by Gaussian noise. The operations of this step refer to, or may be performed by, a mask component as described with reference to FIG. 2. In an example, the region(s) may be determined by one or more bounding boxes of the text. The system adds Gaussian noise to the bounding boxes to create a mask similar to the one illustrated in the Figure.

At operation 415, the system adds color C to a Gaussian mask to create noisy image. The operations of this step refer to, or may be performed by, a noise component as described with reference to FIG. 2. In some embodiments, this operation includes applying color C to the Gaussian mask, and combining the colored Gaussian mask with the image to create the noisy image in the Figure shown next to operation 415. Some embodiments further add fractal noise in areas underneath the region(s) of the text, or on surfaces or edges that were originally in those regions. The fractal noise will cause the generative machine learning model to add fine detail in these areas.

At operation 420, the system generates a new modified image using the noisy image as condition to a generative diffusion model, and combines the original text with the new modified image. In some cases, this completes the first algorithm, and the final design is provided to a user via a user interface. The generative diffusion model may refer to the machine learning model as described with reference to FIG. 2. Additional detail regarding generative diffusion models will be provided with reference to FIGS. 9-12.

As described with reference to FIG. 3, the image editing system can determine that panoptic segmentation was unsuccessful based on an aggregation of probability scores. In this case, the system proceeds to branch B for the second phase of the first algorithm.

Figure 5:
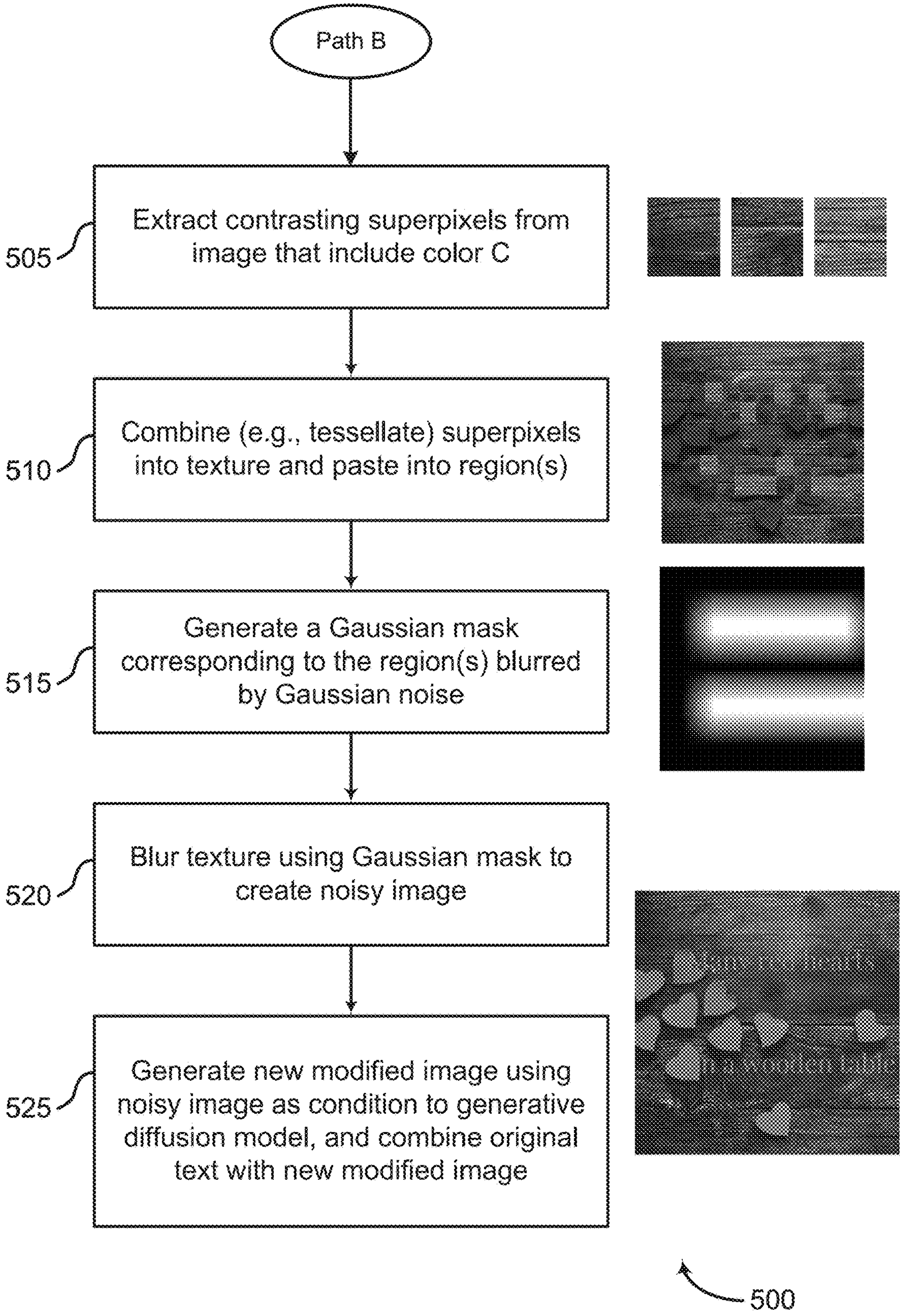
FIG. 5 shows an example of a method for branch B in the second phase in the first algorithm according to aspects of the present disclosure.

FIG. 5 shows an example of method 500 for branch B in the second phase in the first algorithm according to aspects of the present disclosure. In some examples, these operations are performed by a system including a processor executing a set of codes to control functional elements of an apparatus. Additionally or alternatively, one or more processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system extracts contrasting superpixels from the input image that include color C. The operations of this step refer to, or may be performed by, a superpixel component as described with reference to FIG. 2. A superpixel is a block or subregion of the original image that has a mean color outside of a determined range in HSV space. The range may be determined by the color of the input text, and may include three separate ranges for Hue, Saturation, and Value. In some cases, when superpixels cannot be extracted within the range, the range may be reduced and another search may be conducted for superpixels. The search may be conducted using, for example, a sliding window process that checks each subregion of the image in a predetermined size for its mean color. In some cases, the system can create superpixels with a color. For example, after reducing the range, if the system still cannot find suitable superpixels, the system may create its own superpixels with one color, C.

At operation 510, the system combines (e.g., tessellates) superpixels into a texture and pastes the texture into the region(s). The operations of this step may also refer to, or be performed by, a superpixel component as described with reference to FIG. 2. After this operation, an intermediate image may look similar to the image shown next to operation 510 in FIG. 5.

At operation 515, the system generates a Gaussian mask corresponding to the region(s) blurred by Gaussian noise. The operations of this step refer to, or may be performed by, a mask component as described with reference to FIG. 2. In an example, the region(s) may be determined by one or more bounding boxes of the text. The system adds Gaussian noise to the bounding boxes to create a mask similar to the one illustrated in the Figure.

At operation 520, the system blurs the texture using the Gaussian mask to create a noisy image. This step can involve combining the Gaussian mask with the intermediate image.

At operation 525, the system generates new modified image using noisy image as condition to generative diffusion model, and combine original text with new modified image. In some cases, this completes the first algorithm, and the final design is provided to a user via a user interface. The generative diffusion model may refer to the machine learning model as described with reference to FIG. 2. Additional detail regarding generative diffusion models will be provided with reference to FIGS. 9-12.

In some cases, a user wishes to produce a new image, i.e., an image without objects or features from a previous image, to use as a modified image for a design with text. In such cases, embodiments are also configured to perform a second algorithm that uses pure noise and colored noise as the basis for generating additional backgrounds, rather than a noisy image consisting of noise applied to a starting image.

Figure 6:
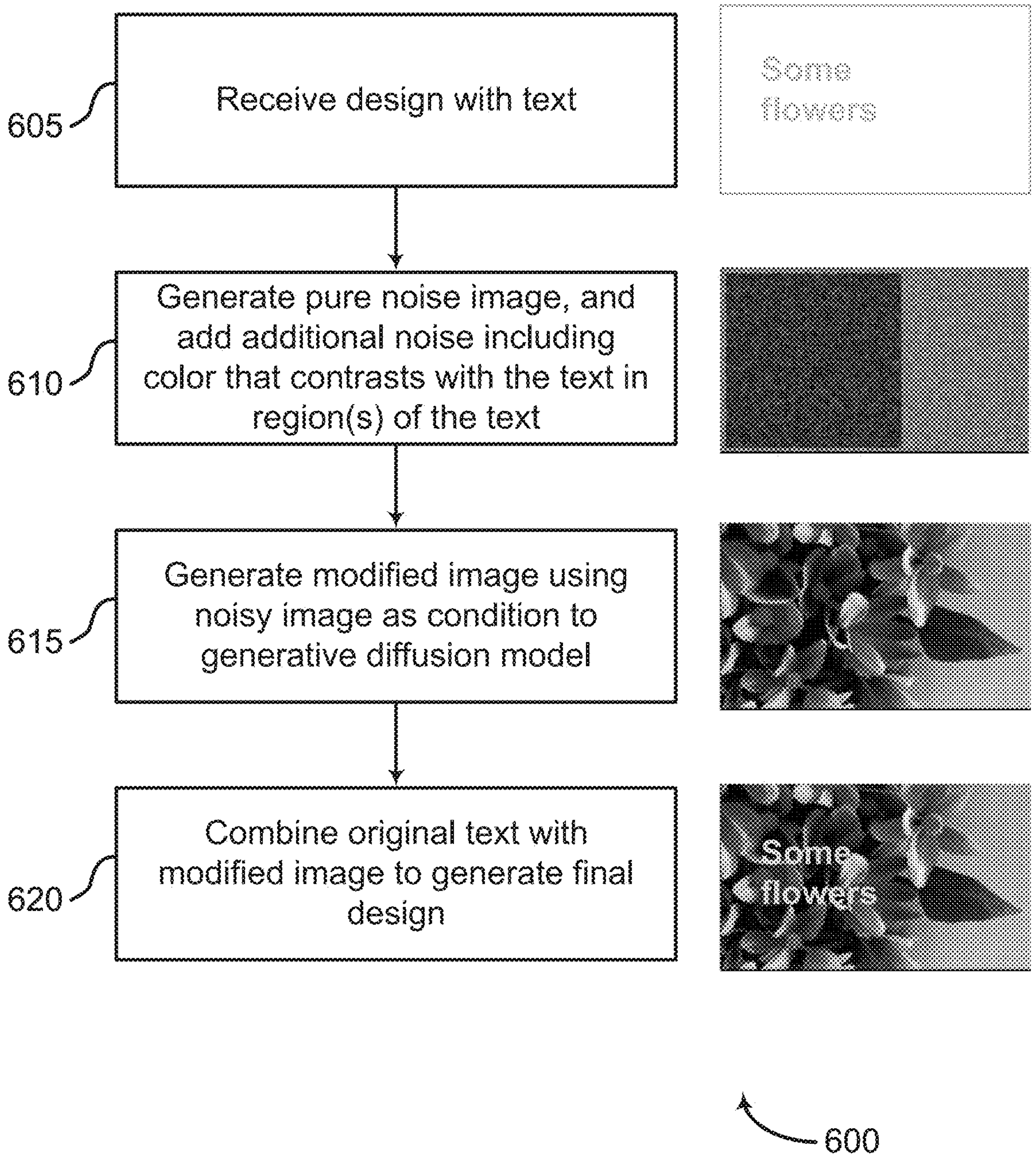
FIG. 6 shows an example of a method for a second algorithm for image harmonization according to aspects of the present disclosure.

FIG. 6 shows an example of method 600 for the second algorithm for image harmonization according to aspects of the present disclosure. In some examples, these operations are performed by a system including a processor executing a set of codes to control functional elements of an apparatus. Additionally or alternatively, one or more processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives a design with text. For example, a user may provide the system with the design via a user interface such as graphical user interface (GUI). In some cases, the design includes a starter image. In some cases, the design does not include a starter image, e.g. as illustrated in FIG. 6.

At operation 610, the system generates a pure noise image, and adds additional noise that includes a color that contrasts with the text in region(s) of the text. The operations of this step refer to, or may be performed by, a noise component as described with reference to FIG. 2. For example, the system may create an image with a pre-configured aspect ratio and resolution that consists of pure white noise. Then, the system may determine a color that contrasts with the color of the text, e.g., based on methods described with reference to FIG. 3. Then, the system may add additional noise including the contrasting color in a region of the text, such as a bounding box of the text.

At operation 615, the system generates a modified image using the noisy image as condition to a generative diffusion model. The generative diffusion model may refer to the machine learning model as described with reference to FIG. 2. Additional detail regarding generative diffusion models will be provided with reference to FIGS. 9-12.

At operation 620, the system combines the original text with the modified image to generate the final design. In some cases, this step completes the second algorithm. The system may then present the final design to a user via a user interface.

Figure 7:
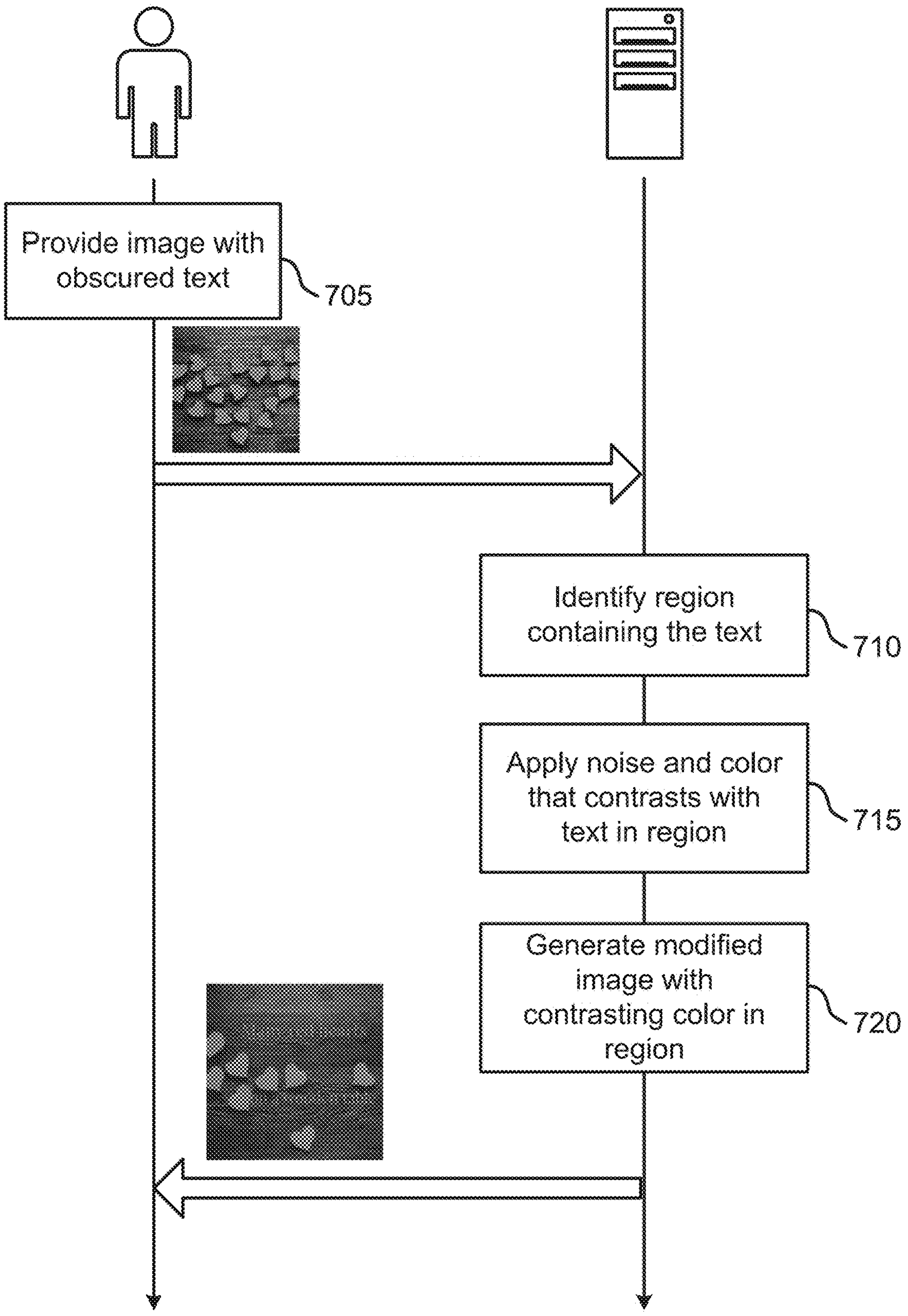
FIG. 7 shows an example of a method for providing a design to a user according to aspects of the present disclosure.

FIG. 7 represents a use case of embodiments described herein, and shows an example of a method 700 for providing a design to a user according to aspects of the present disclosure. In some examples, these operations are performed by a system including a processor executing a set of codes to control functional elements of an apparatus. Additionally or alternatively, one or more processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the user provides an image with text. For example, a user may provide the system with the image and the text via a user interface such as graphical user interface (GUI). The GUI may be a component of an illustrator program or a web-app.

At operation 710, the system identifies a region containing the text. This information may be already known or cached in the bounding box of the text.

At operation 715, the system applies noise and a color that contrasts with the text in the region. For example, the system may apply the noise using the object coloring method described with reference to FIG. 4, or the superpixel method as described with reference to FIG. 5.

At operation 720, the system generates a modified image with the contrasting color in the region. The system may use a generative machine learning model to perform this operation. Additional detail regarding generative diffusion models will be provided with reference to FIGS. 9-12.

Figure 8:
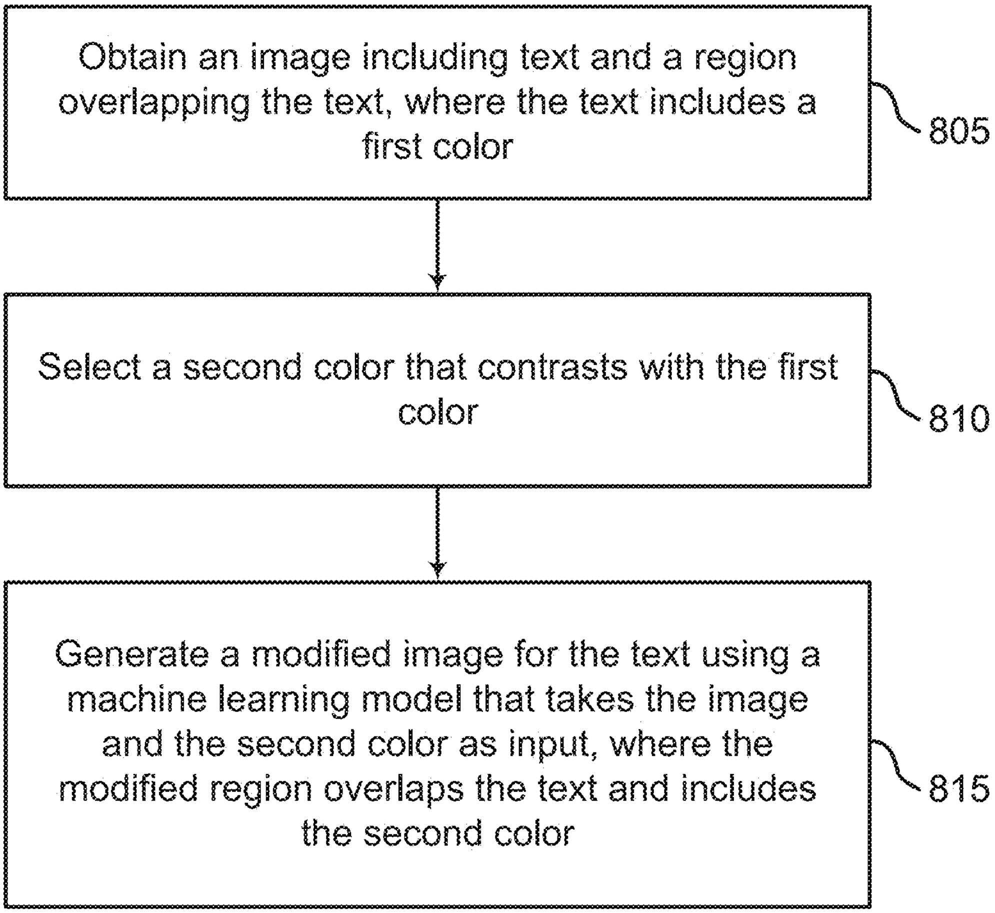
FIG. 8 shows an example of a method for image editing according to aspects of the present disclosure.

FIG. 8 shows an example of a method 800 for image editing according to aspects of the present disclosure. The process of increasing compatibility between an underlying image and text is sometimes referred to as "image harmonization". In some examples, the operations are performed by a system including a processor executing a set of codes to control functional elements of an apparatus. Additionally or alternatively, one or more processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains an image and text overlapping the image, where the text includes a first color. In some cases, the operations of this step refer to, or may be performed by, an image editing apparatus as described with reference to FIGS. 1 and 2. For example, a user may provide the system with the image and the text via a user interface such as graphical user interface (GUI). The GUI may be a component of an illustrator program or a web-app.

At operation 810, the system selects a second color that contrasts with the first color. In some cases, the operations of this step refer to, or may be performed by, a contrasting color extractor as described with reference to FIG. 2. The system may determine the second color according to the methods described with reference to FIG. 3. For example, the system may determine the second color using a color from the image that has sufficient contrast with a color of the text, as measured by a ratio of luminosities between the two colors. The luminosities may be determined after converting from one color space, such as an HSV or an RGB space, to a Lab space.

At operation 815, the system generates a modified image for the text based on the second color using a machine learning model, where the modified image includes the second color in a region corresponding to the text. The machine learning model may be a generative machine learning model such as a stable diffusion model, and additional detail thereof will be provided with reference to FIGS. 9-12.

Generative Machine Learning Model

Figure 9:
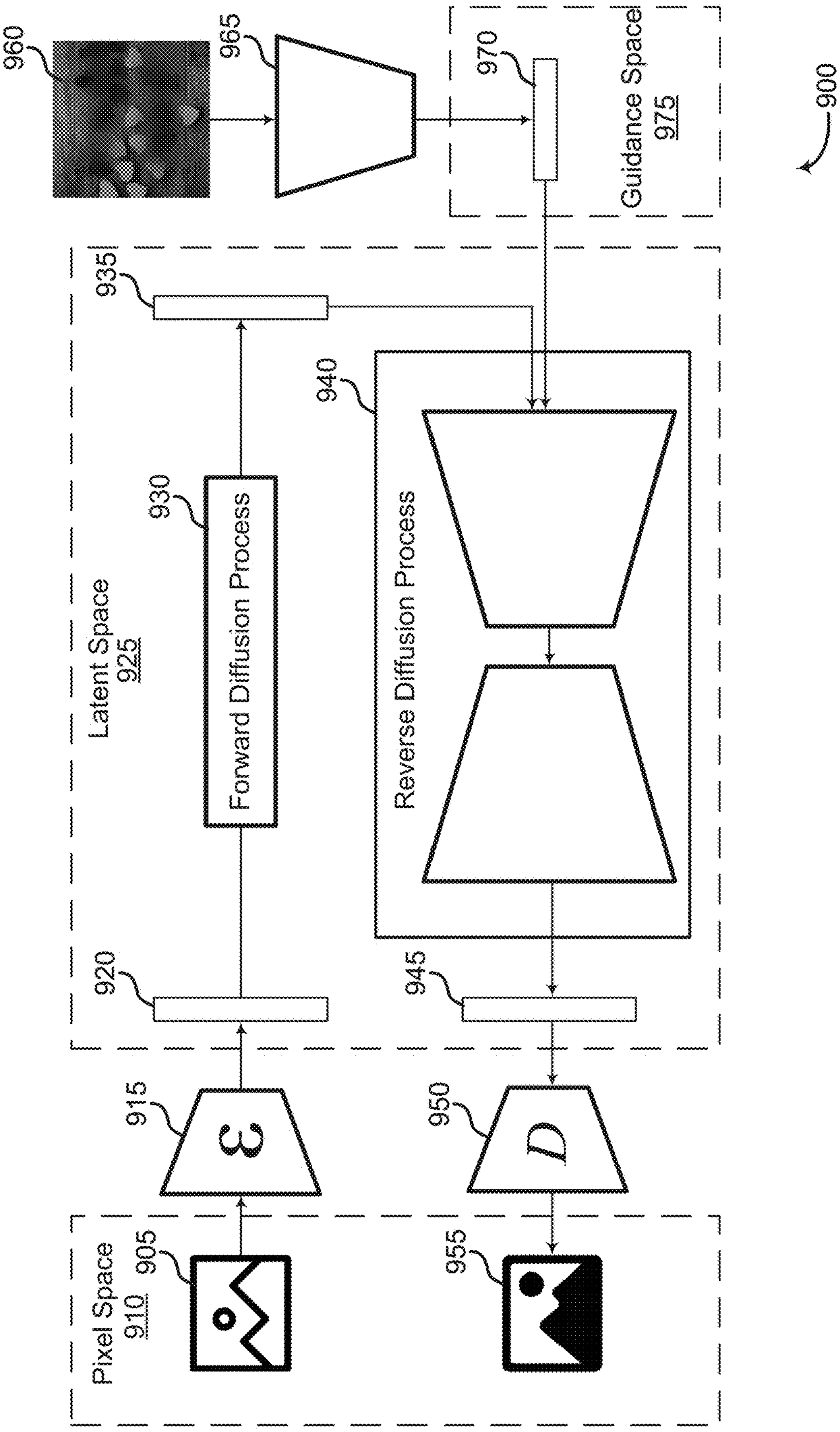
FIG. 9 shows an example of a guided latent diffusion model according to aspects of the present disclosure.

FIG. 9 shows an example of a guided latent diffusion model 900 according to aspects of the present disclosure. The guided latent diffusion model 900 depicted in FIG. 9 is an example of, or includes aspects of, the machine learning model described with reference to FIG. 2. The example shown includes guided latent diffusion model 900, original image 905, pixel space 910, image encoder 915, original image features 920, latent space 925, forward diffusion process 930, noisy features 935, reverse diffusion process 940, denoised image features 945, image decoder 950, output image 955, guidance prompt 960, multimodal encoder 965, guidance features 970, and guidance space 975. Original image 905, forward diffusion process 930, and reverse diffusion process 940 are examples of, or include aspects of, the corresponding elements described with reference to FIG. 11.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 900 may take an original image 905 in a pixel space 910 as input and apply an image encoder 915 to convert original image 905 into original image features 920 in a latent space 925. Then, a forward diffusion process 930 gradually adds noise to the original image features 920 to obtain noisy features 935 (also in latent space 925) at various noise levels.

Next, a reverse diffusion process 940 (e.g., a U-Net ANN) gradually removes the noise from the noisy features 935 at the various noise levels to obtain denoised image features 945 in latent space 925. In some examples, the denoised image features 945 are compared to the original image features 920 at each of the various noise levels, and parameters of the reverse diffusion process 940 of the diffusion model are updated based on the comparison. Finally, an image decoder 950 decodes the denoised image features 945 to obtain an approximation of the existing noise in the input image in pixel space 910. Then the output image 955 is obtained as the difference between the input image 910 from which a controllable fraction of the previously predicted noise is subtracted. In some cases, an output image 955 is created at each of the various noise levels. The output image 955 can be compared to the original image 905 to train the reverse diffusion process 940.

In some cases, image encoder 915 and image decoder 950 are pre-trained prior to training the reverse diffusion process 940. In some examples, they are trained jointly, or the image encoder 915 and image decoder 950 and fine-tuned jointly with the reverse diffusion process 940.

The reverse diffusion process 940 can also be guided based on a guidance prompt 960, such as an image, a layout, a segmentation map, etc. The guidance prompt 960 can be encoded using a multimodal encoder 965 to obtain guidance features 970 in guidance space 975. The guidance features 970 can be combined with the noisy features 935 at one or more layers of the reverse diffusion process 940 to ensure that the output image 955 includes content described by the guidance prompt 960. When generating a new modified image, for instance, the new modified image will contain features from the original image since the noisy image supplied as guidance prompt 960 is based on the original image. Guidance features 970 can be combined with the noisy features 935 using a cross-attention block within the reverse diffusion process 940.

Figure 10:
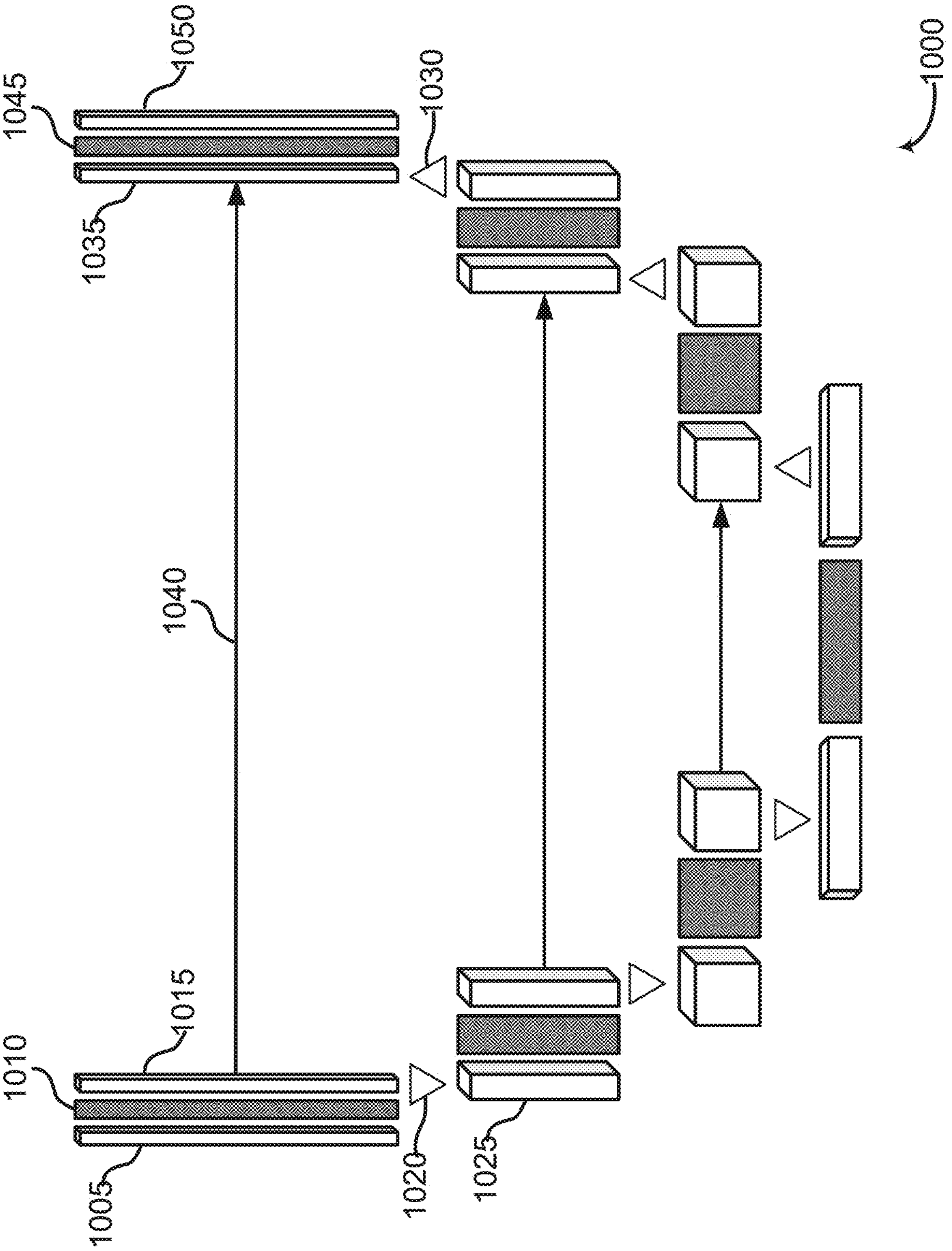
FIG. 10 shows an example of a U-net architecture according to aspects of the present disclosure.

FIG. 10 shows an example of a U-net 1000 architecture according to aspects of the present disclosure. The example shown includes U-Net 1000, input features 1005, initial neural network layer 1010, intermediate features 1015, down-sampling layer 1020, down-sampled features 1025, up-sampling process 1030, up-sampled features 1035, skip connection 1040, final neural network layer 1045, and output features 1050. The U-Net 1000 depicted in FIG. 3 is an example of, or includes aspects of, the architecture used within the reverse diffusion process described with reference to FIG. 10.

In some examples, diffusion models are based on a neural network architecture known as a U-Net. The U-Net 1000 takes input features 1005 having an initial resolution and an initial number of channels, and processes the input features 1005 using an initial neural network layer 1010 (e.g., a convolutional network layer) to produce intermediate features 1015. The intermediate features 1015 are then down-sampled using a down-sampling layer 1020 such that down-sampled features 1025 features have a resolution less than the initial resolution and a number of channels greater than the initial number of channels.

This process is repeated multiple times, and then the process is reversed. That is, the down-sampled features 1025 are up-sampled using up-sampling process 1030 to obtain up-sampled features 1035. The up-sampled features 1035 can be combined with intermediate features 1015 having a same resolution and number of channels via a skip connection 1040. These inputs are processed using a final neural network layer 1045 to produce output features 1050. In some cases, the output features 1050 have the same resolution as the initial resolution and the same number of channels as the initial number of channels.

In some cases, U-Net 1000 takes additional input features to produce conditionally generated output. For example, the additional input features could include a vector representation of an input prompt. The input prompt can be a text prompt, or a noisy image as described above with reference to FIGS. 3-6. The additional input features can be combined with the intermediate features 1015 within the neural network at one or more layers. For example, a cross-attention module can be used to combine the additional input features and the intermediate features 1015.

Figure 11:
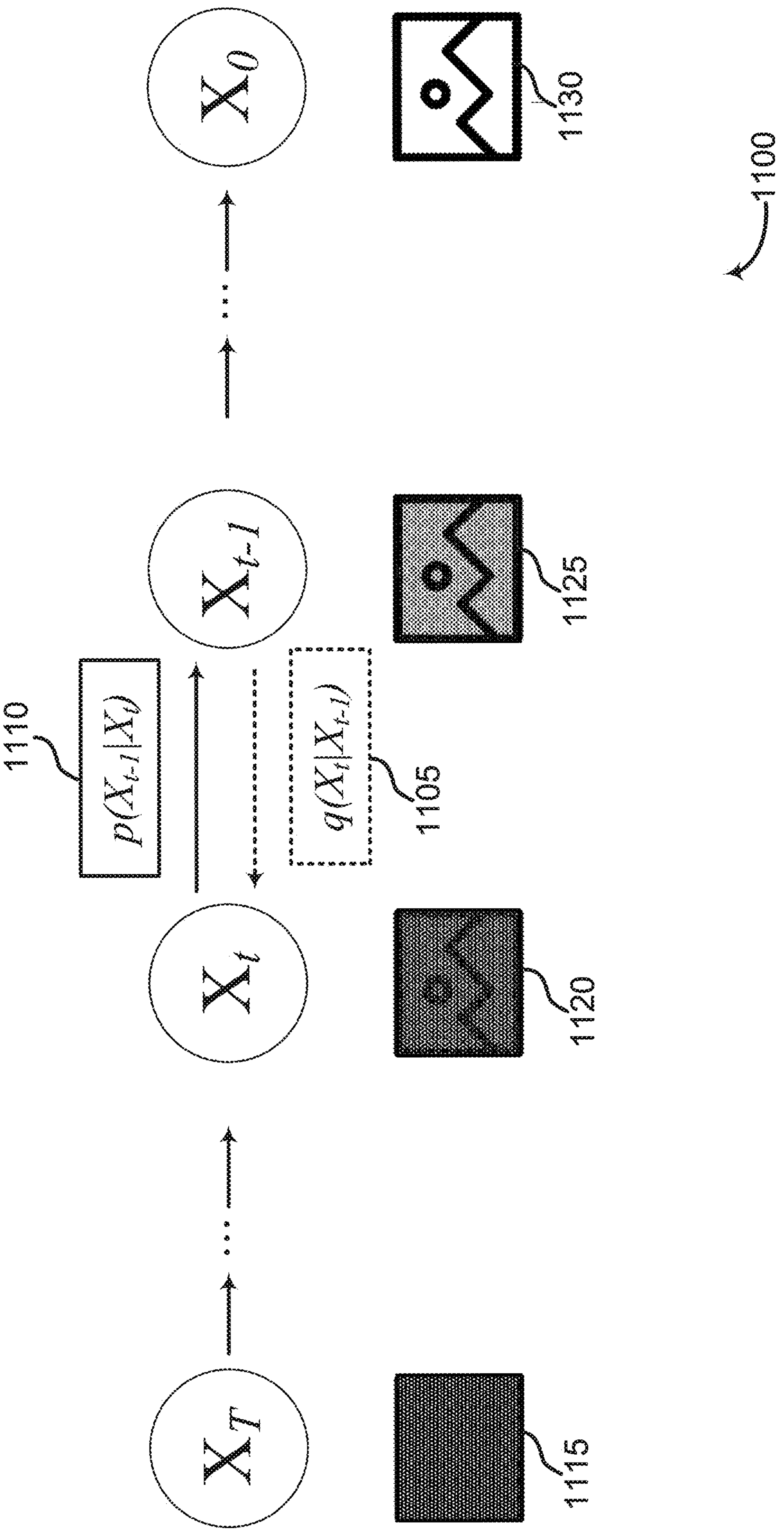
FIG. 11 shows an example of a diffusion process according to aspects of the present disclosure.

FIG. 11 shows an example of a diffusion process 1100 according to aspects of the present disclosure. As described above with reference to FIG. 9, a diffusion model can include both a forward diffusion process 1105 for adding noise to an image (or features in a latent space) and a reverse diffusion process 1110 for denoising the images (or features) to obtain a denoised image. The forward diffusion process 1105 can be represented as $q(x_t|x_{t-1})$, and the reverse diffusion process 1110 can be represented as $p(x_{t-1}|x_t)$. In some cases, the forward diffusion process 1105 is used during training to generate images with successively greater noise, and a neural network is trained to perform the reverse diffusion process 1110 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 1110, the model begins with noisy data $x_T$, such as a noisy image 1115 and denoises the data to obtain the $p(x_{t-1}|x_t)$. At each step t−1, the reverse diffusion process 1110 takes $x_t$, such as first intermediate image 1120, and t as input. Here, t represents a step in the sequence of transitions associated with different noise levels, The reverse diffusion process 1110 outputs $x_{t-1}$, such as second intermediate image 1125 iteratively until $x_T$ is reverted back to $x_0$, the original image 1130. The reverse process can be represented as:

$$p_\theta(x_{t-1}|x_t) := N\left(x_{t-1}; \mu_\theta(x_t, t), \sum\nolimits_\theta(x_t, t)\right). \quad (1)$$

The joint probability of a sequence of samples in the Markov chain can be written as a product of conditionals and the marginal probability:

$$x_T : p_\theta(x_{0:T}) := p(x_T)\prod\nolimits_{t=1}^{T} p_\theta(x_{t-1}|x_t), \quad (2)$$

where $p(x_T)=N(x_T; 0,1)$ is the pure noise distribution as the reverse process takes the outcome of the forward process, a sample of pure noise, as input and $$\prod\nolimits_{t=1}^{T} p_\theta(x_{t-1}|x_t)$$

represents a sequence of Gaussian transitions corresponding to a sequence of addition of Gaussian noise to the sample.

At interference time, observed data $x_0$ in a pixel space can be mapped into a latent space as input and a generated data $\tilde{x}$ is mapped back into the pixel space from the latent space as output. In some examples, $x_0$ represents an original input image with low image quality, latent variables $x_1, \ldots, x_T$ represent noisy images, and $\tilde{x}$ represents the generated image with high image quality.

Figure 12:
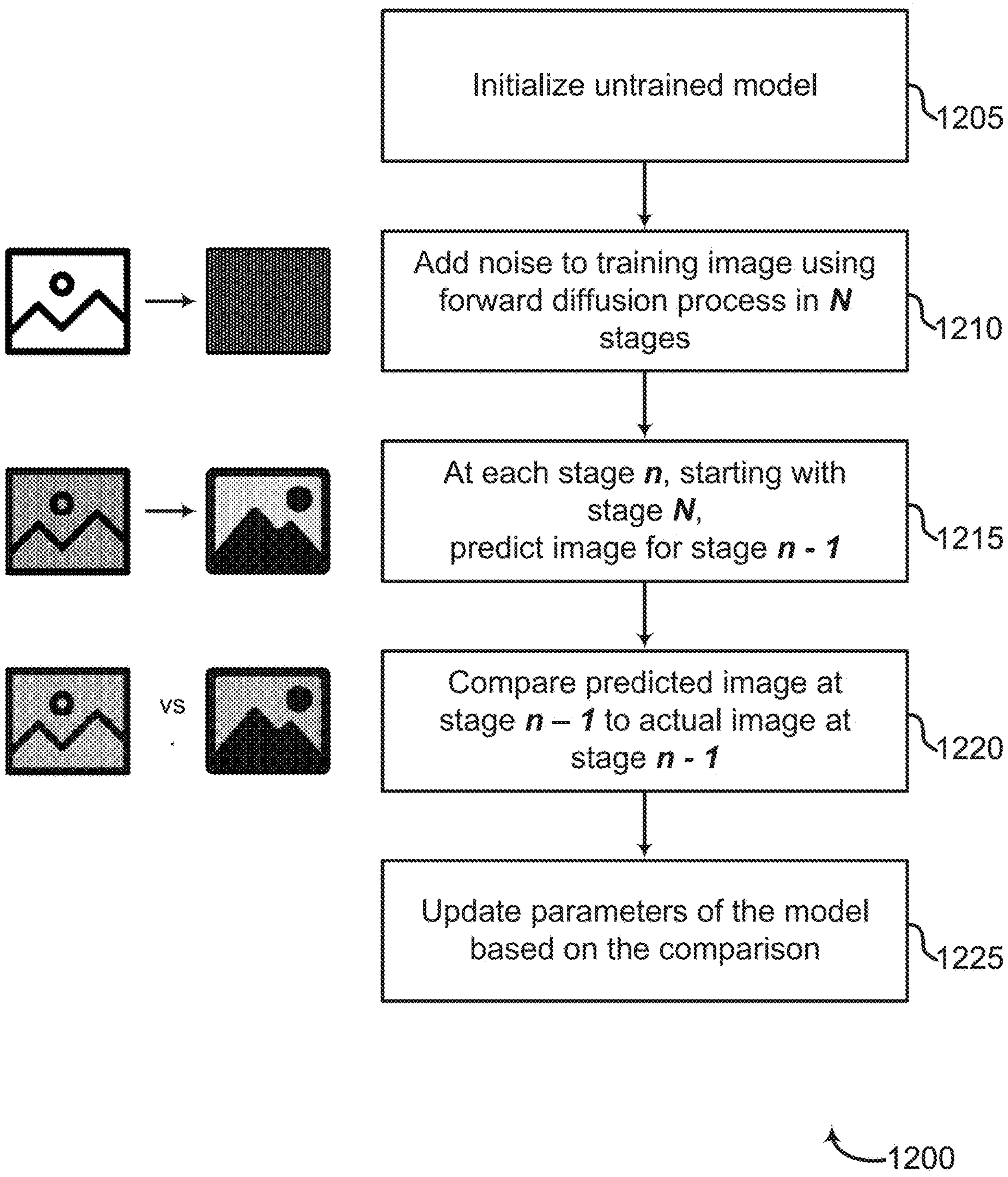
FIG. 12 shows an example of a method for training a diffusion model according to aspects of the present disclosure.

FIG. 12 shows an example of a method 1200 for training a diffusion model according to aspects of the present disclosure. The method 1200 represents an example for training a reverse diffusion process as described above with reference to FIG. 11. In some examples, these operations are performed by a system including a processor executing a set of codes to control functional elements of an apparatus, such as the image editing apparatus described in FIG. 2.

Additionally or alternatively, one or more processes of method 1200 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1210, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1215, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1220, the system compares predicted image (or image features) at stage n−1 to an actual image (or image features), such as the image at stage n−1 or the original input image. For example, given observed data x, the diffusion model may be trained to minimize the variational upper bound of the negative log-likelihood-log pe (x) of the training data.

At operation 1225, the system updates parameters of the model based on the comparison. For example, parameters of a U-Net may be updated using gradient descent. Time-dependent parameters of the Gaussian transitions can also be learned.

Figure 13:
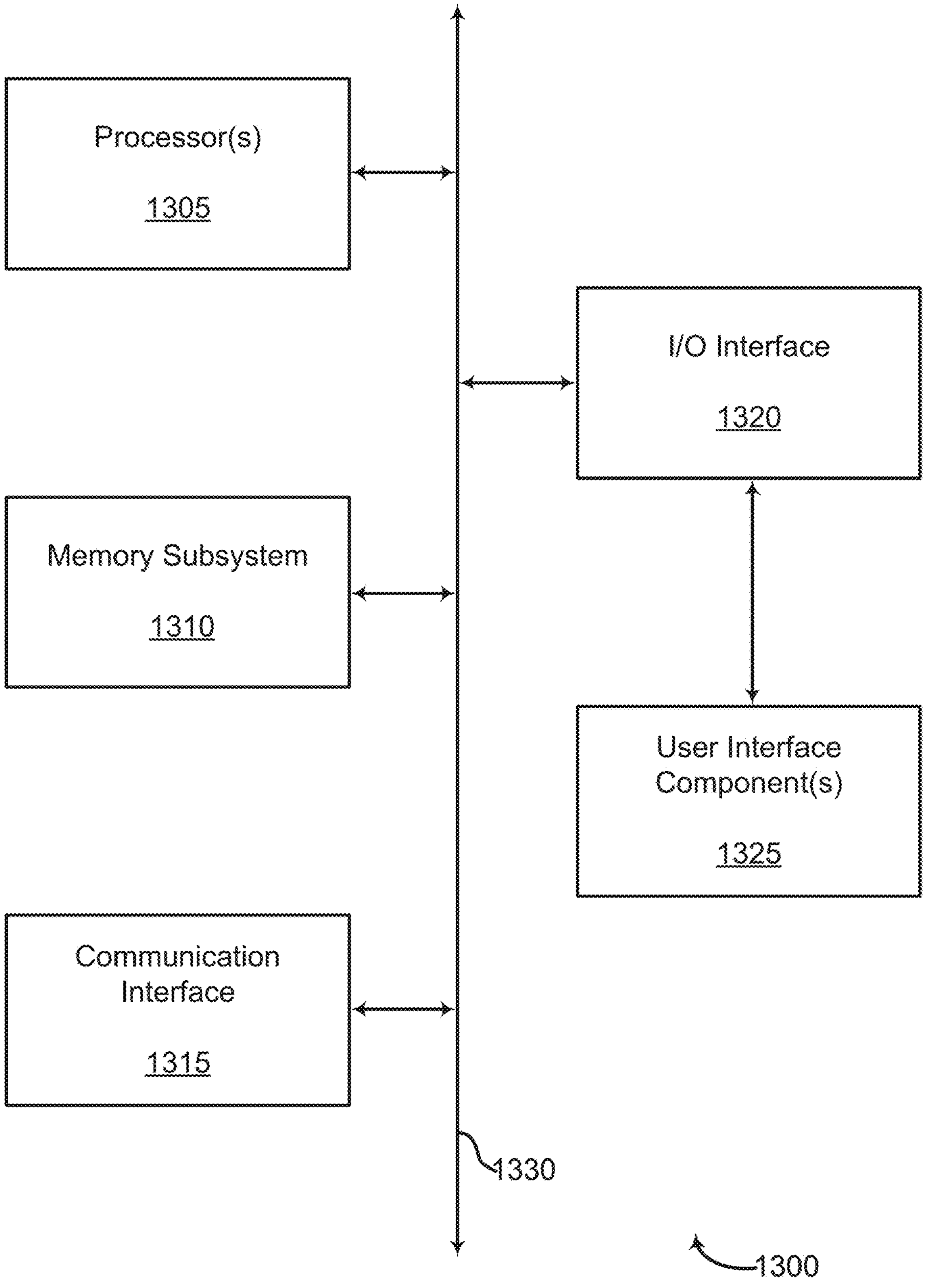
FIG. 13 shows an example of a computing device according to aspects of the present disclosure.

FIG. 13 shows an example of a computing device 1300 configured to harmonize an image with a text according to aspects of the present disclosure. The example shown includes computing device 1300, processor(s), memory subsystem 1310, communication interface 1315, I/O interface 1320, user interface component(s), and channel 1330.

In some embodiments, computing device 1300 is an example of, or includes aspects of, image editing apparatus 100 of FIG. 1. In some embodiments, computing device 1300 includes one or more processors 1305 that can execute instructions stored in memory subsystem 1310 to obtain an image and text overlapping the image, wherein the text comprises a first color; select a second color that contrasts with the first color; and generate a modified image for the text based on the second color using a machine learning model, wherein the modified image includes the second color in a region corresponding to the text.

According to some aspects, computing device 1300 includes one or more processors 1305. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1310 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1315 operates at a boundary between communicating entities (such as computing device 1300, one or more user devices, a cloud, and one or more databases) and channel 1330 and can record and process communications. In some cases, communication interface 1315 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1320 is controlled by an I/O controller to manage input and output signals for computing device 1300. In some cases, I/O interface 1320 manages peripherals not integrated into computing device 1300. In some cases, I/O interface 1320 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1325 enables a user to interact with computing device 1300. In some cases, user interface component(s) 1325 include an audio device, such as an external speaker system, an external display device such as a display screen, an input device (e.g., a remote control device interfaced with a user interface directly or through the I/O controller), or a combination thereof. In some cases, user interface component(s) 1325 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media.

For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an image including text and a region overlapping the text, wherein the text comprises a first color;

selecting a second color that contrasts with the first color; and generating a modified image including the text and a modified region by performing a reverse diffusion process using a machine learning model that takes the image and the second color as input, wherein the modified region overlaps the text and includes the second color.

2. The method of claim 1, further comprising:

segmenting the region to identify one or more objects overlapping the text; and applying the second color to the one or more objects to obtain a first modified region, wherein the modified image is generated based on the first modified region.

3. The method of claim 1, further comprising:

adding noise to the region overlapping the text to obtain a noisy image, wherein the modified image is generated based on the noisy image.

4. The method of claim 3, further comprising:

generating a mask indicating the region overlapping the text, wherein the noise is added to the image based on the mask.

5. The method of claim 3, wherein:

at least a portion of the noise comprises colored noise corresponding to the second color.

6. The method of claim 1, further comprising:

combining the image and the modified image to obtain a combined image.

7. The method of claim 1, further comprising:

superimposing the text on the modified image to obtain a composite image.

8. The method of claim 1, further comprising:

generating a color palette based on the region overlapping the text, wherein the second color is selected from the color palette.

9. A non-transitory computer readable medium storing code, the code comprising instructions executable by a processor to:

obtain an image including text and a region overlapping the text, wherein the text comprises a first color;

select a second color from the region overlapping the text, wherein the second color contrasts with the first color; and generate a modified image including the text and a modified region by performing a reverse diffusion process using a machine learning model that takes the image and the second color as input, wherein the modified region overlaps the text and includes the second color.

10. The non-transitory computer readable medium of claim 9, wherein the code further comprises instructions executable by the processor to:

segment the image to identify one or more objects in the region overlapping the text; and apply the second color to the one or more objects to obtain a first modified region, wherein the modified image is generated based on the first modified region.

11. The non-transitory computer readable medium of claim 10, wherein the code further comprises instructions executable by the processor to:

compute a probability score for the one or more objects indicating a likelihood of a presence of the one or more objects;

determine a low probability for the presence of the one or more objects based on the probability score; and extract a plurality of superpixels from the region overlapping the text based on the determination, wherein the first modified region includes the plurality of superpixels.

12. The non-transitory computer readable medium of claim 9, wherein the code further comprises instructions executable by the processor to:

add noise to the image in the region overlapping the text to obtain a noisy image, wherein the modified image is generated based on the noisy image.

13. The non-transitory computer readable medium of claim 9, wherein the code further comprises instructions executable by the processor to:

combine the image and the modified image to obtain a combined image.

14. The non-transitory computer readable medium of claim 9, wherein the code further comprises instructions executable by the processor to:

superimpose the text on the modified image to obtain a composite image.

15. An apparatus for image editing, comprising:

a processor;

a memory including instructions executable by the processor to perform operations including:

obtain an image and text overlapping the image, wherein the text comprises a first color;

select a second color that contrasts with the first color; and generate a background image for the text based on the second color by performing a reverse diffusion process using a machine learning model, wherein the background image includes the second color in a region corresponding to the text.

16. The apparatus of claim 15, further comprising:

a segmentation component configured to segment the image to identify one or more objects.

17. The apparatus of claim 15, further comprising:

a noise component configured to add noise to the image in the region corresponding to the text.

18. The apparatus of claim 15, further comprising:

a superpixel component configured to extract a plurality of superpixels from the region corresponding to the text.

19. The apparatus of claim 15, further comprising:

a combination component configured to combine the image and the background image to obtain a combined image.

20. The apparatus of claim 15, wherein:

the machine learning model comprises a generative diffusion model.

* * * * *